United States Patent
Cook et al.

[11] 3,950,075
[45] Apr. 13, 1976

[54] LIGHT SOURCE FOR OPTICAL WAVEGUIDE BUNDLE

[75] Inventors: Thomas A. Cook; Marshall C. Hudson, both of Corning, N.Y.

[73] Assignee: Corning Glass Works, Corning, N.Y.

[22] Filed: Feb. 6, 1974

[21] Appl. No.: 440,068

[52] U.S. Cl. ....... 350/96 C; 350/96 B; 350/96 WG; 350/175 SL
[51] Int. Cl.² .......................................... G02B 5/16
[58] Field of Search........... 350/96 B, 96 C, 96 WG, 350/175 SL; 250/227, 551–553; 313/512; 357/17, 72, 73

[56] References Cited
UNITED STATES PATENTS

| | | | |
|---|---|---|---|
| 3,288,585 | 11/1966 | Clarke...................... | 350/175 SL X |
| 3,582,637 | 6/1971 | Cecil........................ | 350/96 C X |
| 3,596,136 | 7/1971 | Fischer..................... | 350/175 SL X |
| 3,626,194 | 12/1971 | Hirano et al................ | 250/552 |
| | | Judin........................ | 350/175 SL X |
| 3,724,383 | 4/1975 | Gallaghan et al. ........ | 350/175 SL X |
| 3,760,237 | 9/1973 | Jaffe........................ | 313/512 X |
| 3,790,791 | 2/1974 | Anderson.................. | 350/96 C X |
| 3,792,284 | 2/1974 | Kaelin...................... | 350/96 C X |
| 3,805,347 | 4/1974 | Collins et al.............. | 357/72 X |
| 3,809,908 | 5/1974 | Clanton.................... | 350/96 C X |

*Primary Examiner*—David H. Rubin
*Attorney, Agent, or Firm*—William J. Simmons, Jr.; Walter S. Zebrowski; Clarence R. Patty, Jr.

[57] ABSTRACT

A source of optical wave energy for an optical communication system. One end of an optical waveguide fiber bundle is disposed in light-receiving relationship with respect to light from a Lambertian-type light source such as a light emitting diode. A spherical bead of transparent material disposed between the diode and the fiber bundle endface provides a rugged and inexpensive optical device that tends to collimate the light emitted from the diode.

5 Claims, 3 Drawing Figures

LIGHT SOURCE FOR OPTICAL WAVEGUIDE BUNDLE

BACKGROUND OF THE INVENTION

Optical waveguides, which are a promising transmission medium for optical communication systems, normally consist of an optical fiber having a core of transparent material having a refractive index $n_1$ surrounded by a layer of transparent cladding material having a refractive index $n_2$ which is lower than $n_1$. A plurality of waveguide fibers are often disposed in side-by-side relation to form a fiber bundle in order to propagate to the receiver more light than can be carried by a single fiber and to provide redundancy in the event that some fibers break.

It has been known for some time that light can be propagated along a transparent fiber structure having a refractive index that is higher than its surroundings, and clad fibers have been employed to transmit light over relatively short distances. To introduce light into such a fiber from a medium having a refractive index $n_o$, the light must be directed toward the fiber endface within a meridional entrance cone having a half angle $\theta_c$ measured from the fiber axis, wherein $$\theta_c = \sin^{-1} \frac{(n_1^2 - n_2^2)^{1/2}}{n_o} \qquad (1)$$

The numerical aperture (N.A.) of such a fiber, which is a measure of the light gathering ability thereof, is defined as follows:

$$\text{N.A.} = n_o \sin \theta_c = (n_1^2 - n_2^2)^{1/2} \qquad (2)$$

In conventional optical fibers the difference between the refractive indices of the core and cladding material is made quite large so that the NA is large, and therefore the fiber is capable of gathering a relatively large amount of light emitted by a source. However, the difference between the refractive indices of the core and cladding of optical waveguides is maintained small to avoid severe distortion of the signal envelope and because presently available materials capable of providing large index differences tend to be lossy.

In accordance with equation (2) this small difference between core and cladding refractive indices in optical waveguides results in a numerical aperture that is smaller than that of conventional optical fibers. Whereas the numerical aperture of commercial optical fibers or light pipes of the conventional type may be as high as about 0.6, the numerical aperture of an optical waveguide is usually between about 0.10 and 0.15, corresponding to an entrance half angle of about 5° to 10°.

Due to the relatively low acceptance angles or numerical apertures exhibited by optical waveguides, radiation from the waveguide light source must be highly directional to efficiently couple to the waveguide or waveguide bundle. Since a coherent light source having the described characteristics can yield efficient coupling, lasers have usually been considered for this role. However, it is often desirable to utilize incoherent light sources such as light emitting diodes, lamps and the like as light sources for optical waveguides. Solid state sources, for example, are advantageous in that they are more rugged and compact than conventional lasers and are more compatible with solid state circuitry. However, the coupling of optical energy directly from such a source to an optical waveguide bundle is extremely inefficient due to the spatial and angular distribution of the source output energy and the low numerical aperture of the fiber bundle. For example, when the light emission distribution is Lambertian, which is a good approximation of the light emission from light emitting diodes, less than two percent of the total emitted radiation falls within the entrance angle exhibited by present low loss optical waveguides. This represents a severe loss in optical coupling when the surface of a diode is disposed in contact with an optical waveguide bundle.

Some light emitting diodes are provided with lensshaped transparent covers over the emitting area. Even though this causes the emitted light to be more directive, the coupling loss between such a diode and an optical waveguide bundle is so great as to preclude the use of such diodes without the use of additional light collimating means. For example, the coupling loss for a Monsanto MV10A diode having a transparent dome disposed adjacent to the end of a waveguide fiber bundle was measured to be 26dB. Losses of this magnitude cannot be tolerated in optical communication systems, especially in view of the fact that waveguide attenuation is as low as about 4dB/km.

In an attempt to decrease coupling losses the lensshaped housing was removed from the light emitting diode by grinding and polishing the housing close to the light-emitting surface thereof, and a lens system was disposed between the diode and the bundle endface. The minimum loss obtained by such an arrangement was 12.3dB for an expensive microscope objective lens system which was relatively difficult to align.

SUMMARY OF THE INVENTION

It is therefore an object of the present invention to provide a rugged, inexpensive light source for optical waveguide bundles. Another object is to provide an easily aligned and constructed light source for optical waveguide bundles.

This invention relates to a transmission system for the purpose of guiding optical wave energy, and more particularly, to an optical system for coupling light from a solid state light source to a bundle of low N.A. optical waveguide fibers. Briefly, the system of this invention comprises, in longitudinal axial alignment, a solid state light source, a transparent spherical bead of uniform refractive index, and a bundle of optical waveguides disposed in side-by-side relation. The ends of the waveguides are disposed in a single plane to form an endface that is disposed adjacent to the transparent bead. The diameter of the bead is at least as large as that of the bundle.

DESCRIPTION OF THE PREFERRED EMBODIMENT

Figure 1:
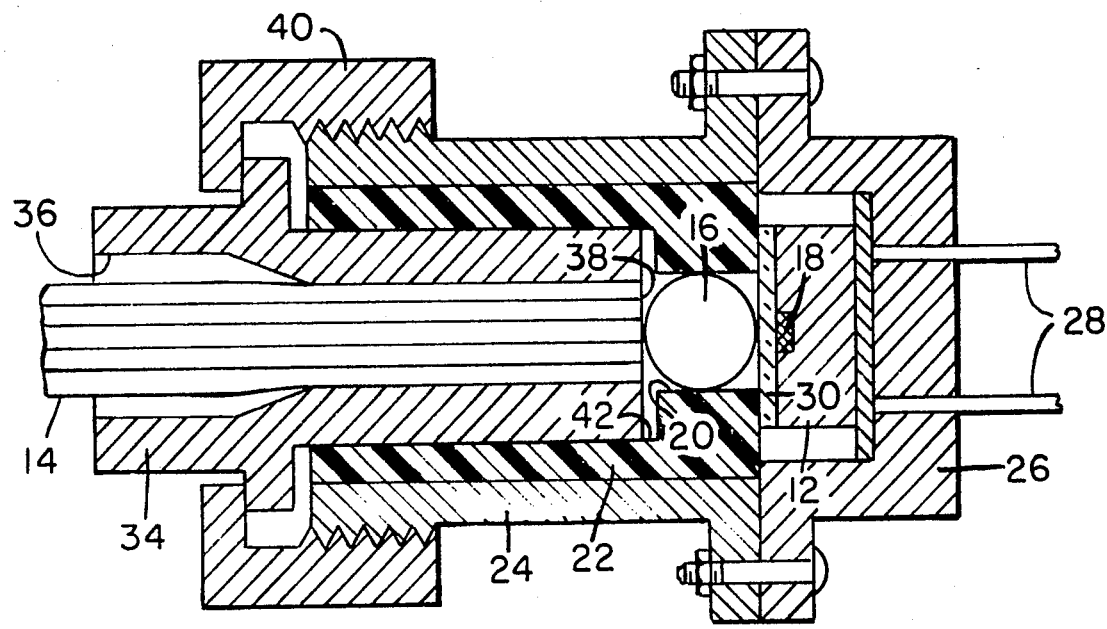
FIG. 1 is a cross-sectional view of an input portion of an optical communication system constructed in accordance with the present invention.

FIG. 1 shows a cross-sectional view of an input portion of an optical communication system including a diode 12 for emitting optical wave energy to be coupled to optical waveguide bundle 14. In accordance with the present invention a transparent spherical bead 16 is axially aligned with bundle 14 and the center of the light emitting area 18 of diode 12. Bead 16 is securely mounted in an aperture 20 which extends through one end of insert 22 that is disposed in housing 24. The diameter of bead 16 can be slightly larger than the diameter of aperture 20 if insert 22 is made from a material such as plastic which slightly deforms to permit the insertion of bead 16 into aperture 20. Precise alignment of the center of bead 16 along the axis of aperture 20 results from this force fit. Diode 12 is disposed in a housing 26 which, when affixed to housing 24, causes proper alignment of light emitting area 18 with respect to bead 16. The diode is energized by a pair of electrical leads 28 which extend through housing 26. A thin protective covering 30 of transparent epoxy is disposed over the light emitting surface of diode 12.

Maximum coupling efficiency occurs when the center of light emitting area 18 and the center of bead 16 are disposed on the longitudinal axis of bundle 14. To achieve this alignment, the end of fiber bundle 14 is disposed in termination ferrule 34 which is provided with an aperture 36 that is tapered to facilitate the insertion of bundle 14 therein. Bundle 14 is potted in ferrule 34 by a bonding material such as epoxy, and the ends of the ferrule and fibers are then ground and polished to provide bundle 14 with an optical quality endface 38 that is substantially perpendicular to the longitudinal axis of bundle 14. Ferrule 34 is inserted into an aperture 42 in insert 22 which is coaxial with aperture 20. Sleeve 40 is threaded onto housing 24 and tightened, thereby causing endface 38 to bear upon bead 16, which is thereby secured between the diode and fiber bundle endface 38. Ferrule 34 maintains the ends of the fibers of bundle 14 in a substantially parallel alignment and cooperates with insert 22 to provide the aforementioned alignment between bundle 14, bead 16 and diode 12.

Figure 2:
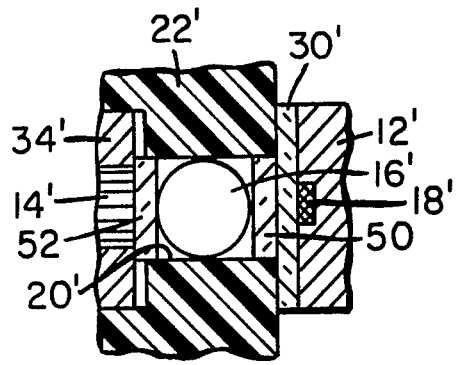
FIG. 2 is a fragmentary cross-sectional view illustrating a modification of the embodiment of FIG. 1.

The coupling efficiency of the system illustrated in FIG. 1 is about ten times better than that wherein the light emitting diode is disposed immediately adjacent to the bundle endface. However, highest coupling efficiency was obtained when the bead was spaced slightly from the diode as illustrated in the fragmentary cross-sectional view of FIG. 2. In this embodiment, wherein elements similar to those of FIG. 1 are represented by primed reference numerals, aperture 20' is extended to accommodate transparent window 50 of plastic, glass or the like, which is disposed between bead 16' and diode 12'. A transparent window 52 could be disposed between bead 16' and the bundle endface.

The following specific example illustrates the improvement in coupling efficiency that can be obtained by the system of the present invention. A Monsanto type MV10B light emitting diode with its epoxy end cap removed was used as the light source. The diameter of the light emitting area was 0.015 inch. The fiber bundle, which had a diameter of 0.093 inch, contained sixty five optical waveguide fibers, each having a diameter of 0.009 inch and a numerical aperture of 0.10. The bundle was terminated in a brass ferrule, the fibers being cemented securely in place by epoxy. The bundle endface was ground and polished flat. A 0.110 diameter borosilicate glass bead having a refractive index of 1.47 was held securely between the diode and the bundle endface, the bundle, bead and diode being axially aligned as shown in FIG. 1. The output end of the optical waveguide bundle which was 12 inches long, was connected to an integrating sphere whereby the total light output from the bundle could be determined. Due to the short length of the bundle, it can be assumed that essentially no loss occurred therein. The amount of light gathered by the fiber bundle and transmitted to the measurement apparatus was 4% of the total light emitted from the diode. The same experiment performed without the glass bead resulted in the transmission of only 0.4% of the total light emitted by the diode.

Figure 3:
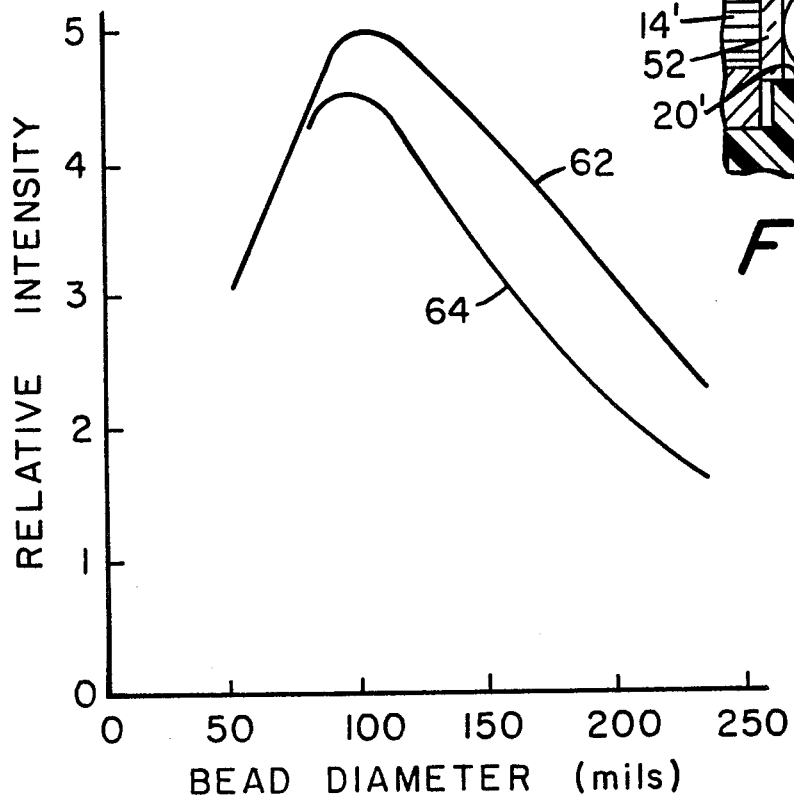
FIG. 3 is a graph illustrating the relationship between the diameter of the transparent spherical light coupling bead and the amount of light coupled thereby to an optical waveguide bundle.

Highest coupling efficiency was obtained when the diameter of the transparent bead was slightly larger than that of the optical waveguide fiber bundle. This relationship was determined by using beads having diameters between about 50 mils and about 230 mils to couple light from a diode having a light emitting area having a diameter of about 0.015 inches to an optical waveguide bundle having a diameter of 0.093 inches. The results of this experiment are illustrated in FIG. 3 wherein the relative intensity of the light radiated from the output end of the fiber bundle is plotted as a function of bead diameter. As indicated by curve 62, best results were obtained when the bead was slightly spaced, e.g., about 10–20% of the diameter of the bead, from the light emitting diode. A slightly lower coupling efficiency was achieved when the bead touched the diode surface as indicated by curve 64. The peak of curve 62, which occurs at a bead diameter of 0.105 inch, is representative of a coupling loss of 14 dB, the lowest loss achieved by the system of this invention.

We claim:
1. A transmission system for the purpose of guiding optical wave energy comprising, in longitudinal axial alignment,
    a light emitting diode,
    a transparent spherical bead of uniform refractive index,
    a bundle of optical waveguides disposed in side-by-side relation, the ends of said waveguides being disposed in a single plane to form an endface that is disposed adjacent to said bead, and
    deformable means disposed between said endface and said diode for supporting said bead in axial alignment with said bundle, said deformable means having aperture defining means which engages said bead, the diameter of said aperture defining means being less than that of said bead except at the area of contact between said bead and said aperture defining means.

2. A transmission system in accordance with claim 1 wherein said bead is in contact with said endface and said light source.

3. A transmission system in accordance with claim 1 wherein said bead is spaced from said light source.

4. A transmission system in accordance with claim 3 wherein the distance between said light source and said bead is between 10 and 20 percent of the diameter of said bead.

5. A transmission system in accordance with claim 1 wherein said deformable means is made of plastic.

* * * * *